United States Patent
Watanabe et al.

(10) Patent No.: US 11,170,763 B2
(45) Date of Patent: Nov. 9, 2021

(54) VOICE INTERACTION SYSTEM, ITS PROCESSING METHOD, AND PROGRAM THEREFOR

(71) Applicant: Toyota Jidosha Kabushiki Kaisha, Toyota (JP)

(72) Inventors: Narimasa Watanabe, Nagakute (JP); Sawa Higuchi, Toyota (JP); Wataru Kaku, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 201 days.

(21) Appl. No.: 16/425,023

(22) Filed: May 29, 2019

(65) Prior Publication Data

US 2019/0371305 A1 Dec. 5, 2019

(30) Foreign Application Priority Data

May 31, 2018 (JP) .............................. JP2018-104983

(51) Int. Cl.
*G10L 15/18* (2013.01)
*G06F 3/16* (2006.01)
(Continued)

(52) U.S. Cl.
CPC .......... *G10L 15/1822* (2013.01); *G06F 3/167* (2013.01); *G06F 40/211* (2020.01);
(Continued)

(58) Field of Classification Search
CPC . G10L 15/00; G10L 15/1807; G10L 15/1822; G10L 2015/088; G06F 3/00;
(Continued)

(56) References Cited

U.S. PATENT DOCUMENTS 10,339,166 B1 * 7/2019 Mois .................. G06F 16/3329
2004/0143430 A1 * 7/2004 Said ....................... G06F 40/12
704/2

(Continued)

FOREIGN PATENT DOCUMENTS

JP 2001-331191 A 11/2001
JP 2015-148758 A 8/2015
(Continued)

*Primary Examiner* — Paras D Shah
*Assistant Examiner* — Sean E Serraguard
(74) *Attorney, Agent, or Firm* — Dinsmore & Shohl LLP

(57) ABSTRACT

A voice interaction system performs a voice interaction with a user. The voice interaction system includes: ask-again detection means for detecting ask-again by the user; response-sentence generation means for generating, when the ask-again has been detected by the ask-again detection means, a response sentence for the ask-again in response to the ask-again based on a response sentence responding to the user before the ask-again; and storage means for storing a history of the voice interaction with the user. The response-sentence generation means generates, when the response sentence includes a word whose frequency of appearance in the history of the voice interaction in the storage means is equal to or smaller than a first predetermined value, a response sentence for the ask-again formed of only this word or a response sentence for the ask-again in which this word is emphasized in the response sentence.

9 Claims, 3 Drawing Sheets

(51) Int. Cl.
*G06F 40/211* (2020.01)
*G06F 40/284* (2020.01)
*G10L 15/08* (2006.01)

(52) U.S. Cl.
CPC ........ *G06F 40/284* (2020.01); *G10L 15/1807* (2013.01); *G10L 2015/088* (2013.01)

(58) Field of Classification Search
CPC ........ G06F 3/167; G06F 40/00; G06F 40/211; G06F 40/284; G09B 19/00
See application file for complete search history.

(56) References Cited

U.S. PATENT DOCUMENTS

| | | | | |
|---|---|---|---|---|
| 2015/0039292 | A1* | 2/2015 | Suleman | G06F 16/285 |
| | | | | 704/9 |
| 2015/0066479 | A1* | 3/2015 | Pasupalak | G10L 15/30 |
| | | | | 704/9 |
| 2017/0069316 | A1* | 3/2017 | Makino | G10L 15/22 |
| 2017/0103757 | A1* | 4/2017 | Yamamoto | G10L 15/1807 |
| 2017/0337264 | A1* | 11/2017 | Barbosa | G06F 9/453 |

FOREIGN PATENT DOCUMENTS

| | | | |
|---|---|---|---|
| JP | 6073649 B2 | 2/2017 | |
| JP | 2018-104982 A | 7/2018 | |

\* cited by examiner

| WORD | GIFU | HANAKO | MET |
|---|---|---|---|
| FREQUENCY OF APPEARANCE | 52 TIMES | 5 TIMES | 0 TIMES |
| TF-IDF | 0.52 | 0.77 | 0.11 |

Fig. 3

VOICE INTERACTION SYSTEM, ITS PROCESSING METHOD, AND PROGRAM THEREFOR

CROSS REFERENCE TO RELATED APPLICATIONS

This application is based upon and claims the benefit of priority from Japanese patent application No. 2018-104983, filed on May 31, 2018, the disclosure of which is incorporated herein in its entirety by reference.

BACKGROUND

The present disclosure relates to a voice interaction system that performs a voice interaction with a user, its processing method, and a program therefor.

A voice interaction system that outputs, upon detecting ask-again (see an explanation of "ask-again") from a user, a response sentence that is the same as the response sentence before the ask-again has been known (see Japanese Patent No. 6073649).

In the aforementioned voice interaction system, it is possible that, when there are words that are difficult for the user to hear in the response sentence, the user may still not be able to easily hear the response sentence even when this response sentence is repeated.

SUMMARY

The present disclosure has been made in order to solve the aforementioned problems, and the main object of the present disclosure is to provide a voice interaction system that outputs, upon detecting ask-again by a user, a response sentence that the user can easily hear, its processing method, and a program therefor.

One aspect of the present disclosure to accomplish the aforementioned object is a voice interaction system that performs a voice interaction with a user, the system including: ask-again detection means for detecting ask-again by the user; response-sentence generation means for generating, when the ask-again has been detected by the ask-again detection means, a response sentence for the ask-again in response to the ask-again based on a response sentence responding to the user before the ask-again; and storage means for storing a history of the voice interaction with the user, in which the response-sentence generation means generates, when the response sentence includes a word whose frequency of appearance in the history of the voice interaction in the storage means is equal to or smaller than a first predetermined value, a response sentence for the ask-again formed of only this word or a response sentence for the ask-again in which this word is emphasized in the response sentence.

In this aspect, the response-sentence generation means may generate, when the response sentence includes a word whose frequency of appearance in the history of the voice interaction in the storage means is the lowest, a response sentence for the ask-again formed of only this word or a response sentence for the ask-again in which this word is emphasized in the response sentence.

In this aspect, the response-sentence generation means may generate, when the response sentence includes a word whose frequency of appearance in the history of the voice interaction in the storage means is equal to or smaller than the first predetermined value, at least one of a response sentence for the ask-again in which the voice speed of this word is made lower than the voice speed of words other than this word, a response sentence for the ask-again in which the volume of this word is made larger than the volume of words other than this word, and a response sentence for the ask-again in which a space is made between this word and the preceding and following words.

In this aspect, the response-sentence generation means may generate, when the response sentence includes a word whose frequency of appearance in the history of the voice interaction in the storage means is equal to or smaller than the first predetermined value and whose degree of importance is equal to or larger than a second predetermined value, a response sentence for the ask-again formed of only this word or a response sentence for the ask-again in which this word is emphasized tri the response sentence.

In this aspect, the voice interaction system may further include topic detection means for estimating a topic of the voice interaction and detecting a change in the topic that has been estimated, in which the ask-again detection means may detect, when the change in the topic has been detected by the topic detection means, the user's voice as the ask-again by the user based on prosodic information on the user's voice.

In this aspect, the voice interaction system may further include prosody detection means for analyzing the prosodic information on the user's voice and detecting an amount of change in the prosody, in which the ask-again detection means may detect, when the change in the topic has been detected by the topic detection means and the amount of change in the prosody detected by the prosody detection means is equal to or larger than a predetermined amount, the user's voice as the ask-again by the user.

One aspect of the present disclosure to accomplish the aforementioned object may be a processing method for a voice interaction system that performs a voice interaction with a user, the method including the steps of: detecting ask-again by the user; generating, when the ask-again has been detected, a response sentence for the ask-again in response to the ask-again based on a response sentence responding to the user before the ask-again; and generating, when the response sentence includes a word whose frequency of appearance in a history of the voice interaction with the user is equal to or smaller than a first predetermined value, a response sentence for the ask-again formed of only this word or a response sentence for the ask-again in which this word is emphasized in the response sentence.

One aspect of the present disclosure to accomplish the aforementioned object may be a program for a voice interaction system that performs a voice interaction with a user, the program causing a computer to execute the following processing of: detecting ask-again by the user; and generating, when the ask-again has been detected, a response sentence for the ask-again in response to the ask-again based on a response sentence responding to the user before the ask-again, in which, when the response sentence includes a word whose frequency of appearance in a history of the voice interaction with the user is equal to or smaller than a first predetermined value, a response sentence for the ask-again formed of only this word or a response sentence for the ask-again in which this word is emphasized in the response sentence is generated.

According to the present disclosure, it is possible to provide a voice interaction system, its processing method, and a program therefor capable of outputting, upon detecting ask-again by a user, a response sentence that the user can easily hear.

The above and other objects, features and advantages of the present disclosure will become more fully understood

BRIEF DESCRIPTION OF DRAWINGS

FIG. 3 is a diagram showing one example of a frequency of appearance of each word in a voice interaction history and a TF-IDF.

DETAILED DESCRIPTION

First Embodiment

Hereinafter, with reference to the drawings, embodiments of the present disclosure will be explained.

Figure 1:
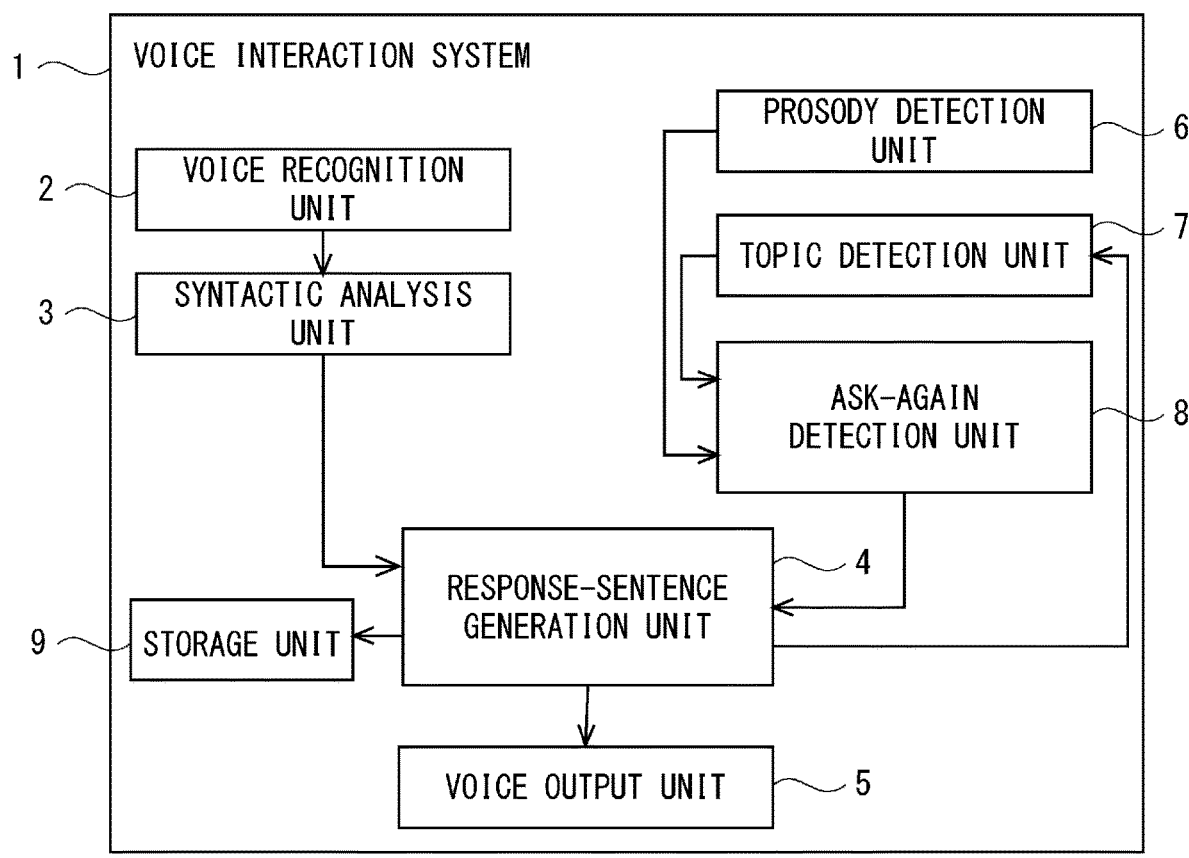
FIG. 1 is a block diagram showing a schematic system configuration of a voice interaction system according to a first embodiment of the present disclosure.

FIG. 1 is a block diagram showing a schematic system configuration of a voice interaction system according to a first embodiment of the present disclosure. A voice interaction system 1 according to the first embodiment is installed, for example, in a robot, a Personal Computer (PC), a mobile terminal (such as a smartphone or a tablet computer), a navigation device or the like, and performs a conversation with a user.

In a case in which the user could not hear the voice of the voice interaction system 1 when the user performs a voice interaction with the voice interaction system 1, the user asks again, for example, "Could you repeat it again?" (hereinafter this user's action is referred to as ask-again). When the voice interaction system 1 according to the first embodiment detects the ask-again by the users voice, the voice interaction system 1 outputs a response sentence that the user can easily hear in response to the ask-again.

The voice interaction system 1 according to the first embodiment includes a voice recognition unit 2 configured to recognize a user's voice, a syntactic analysis unit 3 configured to analyze a sentence structure of the voice, a response-sentence generation unit 4 configured to generate a response sentence in response to the user's voice, a voice output unit 5 configured to output a voice, a prosody detection unit 6 configured to detect an amount of change in the prosody of the user's voice, a topic detection unit 7 configured to detect a change in the topic, an ask-again detection unit 8 configured to detect the ask-again by the user, and a storage unit 9.

Note that the voice interaction system 1 is formed by, for example, hardware mainly using a microcomputer including a Central Processing Unit (CPU) that performs arithmetic processing and so on, a memory that is composed of a Read Only Memory (ROM) and a Random Access Memory (RAM) and stores an arithmetic program executed by the CPU and the like, an interface unit clip that externally receives and outputs signals, and so on. The CPU, the memory, and the interface unit are connected with one another through a data bus or the like.

The voice recognition unit 2 performs, for example, a voice recognition process based on information on a user's voice input through a microphone, converts the information on the user's voice into text, and thereby recognizes it as character-string information.

For example, the voice recognition unit converts the information on the user's voice input through a microphone into a digital signal. The voice recognition unit 2 performs voice recognition by detecting a speech section from the above-described digitized information and performing pattern matching for voice information in the detected speech section by referring to a statistical linguistic model or the like.

Note that the statistical linguistic model is, for example, a probability model used to calculate an occurrence probability of a linguistic expression, such as an occurrence distribution of a word and a distribution of a word that occurs after a certain word, and is obtained by learning connection probabilities on a morpheme basis. The statistical linguistic model is stored in advance in the storage unit 9 or the like. The storage unit 9 is one specific example of storage means. The storage unit 9 is formed off memory or the like.

The voice recognition unit 2 generates part-information-added morpheme information for each morpheme in the users voice information, i.e., information obtained by adding a type of a part (such as a noun, an adjective, a verb, an adjective, etc.) to each morpheme. The voice recognition unit 2 outputs the recognized user's voice information to the syntactic analysis unit 3.

The syntactic analysis unit 3 analyzes a sentence structure of the voice information recognized by the voice recognition unit 2. For example, the syntactic analysis unit 3 performs a morpheme analysis or the like for character-string information representing the vocally-recognized user's voice information by using an ordinary morpheme analyzer and performs a semantic analysis for the character-string information. The syntactic analysis unit 3 outputs a result of the analysis of the character-string information (including morpheme information, modification information, text obtained by the recognition, etc.) to the response-sentence generation unit 4.

The response-sentence generation unit 4 is one specific example of response-sentence generation means. The response-sentence generation unit 4 generates a response sentence to the user's voice information based on a result of the analysis of the voice information analyzed by the syntactic analysis unit 3.

For example, the response-sentence generation unit 4 generates a response sentence to the user's voice information based on a result of the analysis of the character-string information output from the syntactic analysis unit 3. More specifically, the response-sentence generation unit 4 extracts one predicate term "play go" from character-string information "I play go". The syntactic analysis unit 3 performs emotion discrimination (negative and positive) using the extracted morpheme string "play go" as a feature vector and using a Support Vector Machine (SVM) model.

When the result of the emotion discrimination is positive, the response-sentence generation unit 4 generates a response sentence "That sounds good". On the other hand, when the result of the emotion discrimination is negative, the response-sentence generation unit 4 generates a response sentence "It seems to be troublesome". The aforementioned method of generating the response sentence is merely one example, and this embodiment is not limited thereto. A desired generation method may be used. The response-sentence generation unit 4 outputs the response sentence that has been generated to the voice output unit 5.

The voice output unit 5 outputs the response sentence generated by the response-sentence generation unit 4 by voice. The voice output unit 5 outputs, for example, the voice of the response sentence to the user using a speaker or the like.

When the topic of the voice interaction is changed, it may be difficult for the user to hear the voice and the ask-again tends to occur easily. Further, there is a characteristic change in the prosody in the voice of the ask-again. Based on this characteristic of the ask-again, in the voice interaction system 1 according to the first embodiment, when a change in the topic has been detected, the user's voice is detected as the ask-again by the user based on the prosodic information on the user's voice.

Accordingly, it is possible to detect the ask-again, also for a wide range of voices that do not include interjections without requiring the words for the ask-again to be registered in advance. Further, by detecting the ask-again based on the change in the topic and the prosodic information, processing delay is not likely to occur, and it is possible to improve the accuracy of detecting the ask-again without depending on the language of the ask-again and the accuracy of the voice recognition.

The prosody detection unit 6 is one specific example of prosody detection means. The prosody detection unit 6 analyzes, for example, prosodic information on the user's voice input via a microphone, and detects the amount of change in the prosody. When the users voice is the ask-again, characteristics appear at the end of the voice. Therefore, the prosody detection unit 6 divides, for example, a predetermined period of the end of the user's voice into two parts, and detects the difference (or the inclination) between the average value of the height of the voice in the first half section and the average value of the height of the voice in the latter half section as the amount of change in the prosody.

More specifically, the prosody detection unit 6 detects the difference between the average value of the height of the voice for 100 milliseconds at the end of the user's voice and the average value of the height of the voice for 100 milliseconds just before that as the amount of change in the prosody. The prosody detection unit 6 outputs the amount of the change in, the prosody that has been detected to the ask-again detection unit 8.

The topic detection unit 7 is one specific example of topic detection means. The topic detection unit 7 estimates the topic of the voice interaction based on the words (independent words) that appear in the response sentence generated by the response-sentence generation unit 4.

The topic detection unit 7 estimates the topic by comparing the words in the response sentence with table information set in the storage unit 9 in advance. Topics and words included in the respective topics are associated with each other in the table information. The topic detection unit 7 estimates the topic that includes the largest number of words in the table information from among the topics in the table information. When the number of words that have appeared in one topic is the same as that in another topic, the topic detection unit 7 may estimate the highest-order topic in the table information.

The topic detection unit 7 compares, for example, the words "breakfast", "a lot", "ate" in the response sentence "I ate a lot of breakfast" with the table information. The topic detection unit 7 estimates the topic "meal" that includes the largest number of words in the table information "breakfast", "eat" from among the topics "meal", health", and "family" in the table information. The aforementioned method of estimating the topic in the topic detection unit 7 is merely an example, and this embodiment is not limited thereto.

The topic detection unit 7 may estimate the topic of the voice interaction based on the words that appear in the user's voice input via the microphone. The topic detection unit 7 estimates the topic by comparing the words in the user's voice with the table information set in the storage unit 9 in advance.

As described above, the topic detection unit 7 estimates the topic of the voice interaction and detects a change in the topic that has been estimated. When, for example, the topic that has been estimated has been changed from "meal" to "health", the topic detection unit 7 detects the change in the topic.

The ask-again detection unit 8 is one specific example of ask-again detection means. As described above, when a change in the topic has been detected by the topic detection unit 7, the ask-again detection unit 8 detects the user's voice as the ask-again by the user based on the prosodic information on the user's voice.

When the user's voice is ask-again, the amount of change in the prosody becomes large at the end of the voice. This is because in the case of the ask-again, the user speaks as if he/she is asking a question, which makes the tone at the end of the voice high.

Accordingly, the ask-again detection unit 8 detects the user's voice as the ask-again by the user when, for example, the change in the topic is detected by the topic detection unit 7 and the amount of change in the prosody detected by the prosody detection unit 6 is high, that is, equal to or larger than a predetermined amount. The amount of change in the prosody at the end of the voice at the time of ask-again is experimentally obtained in advance as the predetermined amount, and this predetermined amount is set in the storage unit 9. When the ask-again detection unit 8 detects the ask-again, the ask-again detection unit 8 outputs a detection signal indicating the result to the response-sentence generation unit 4.

Incidentally, in voice interaction systems according to related art, it is possible that, when there are words that are difficult for the user to hear in the response sentence for the ask-again, the user may still not be able to easily hear the response sentence even when this response sentence is repeated.

On the other hand, in the voice interaction system 1 according to the first embodiment, the response-sentence generation unit 4 generates, when the response sentence responding to the user just before the ask-again includes a word whose frequency of appearance in the history of voice interaction with the user is equal to or smaller than a first predetermined value, the response sentence for the ask-again formed of only this word.

The response-sentence generation unit 4 generates, for example, for the response sentence just before the ask-again "I went to Gifu to play golf", the response sentence for the ask-again "golf", which is formed of only the word "golf" whose frequency of appearance is equal to or smaller than the first predetermined value.

It can be estimated that words that are not likely to appear frequently in the history of voice interaction with the user (hereinafter this history will be referred to as a voice interaction history) are the words unfamiliar to the user and thus the words that are difficult for the user to hear. Accordingly, when the response sentence just before the ask-again includes words whose frequency of appearance in the history of voice interaction with the user is low, that is, equal to or smaller than the first predetermined value, the response-sentence generation unit 4 generates the response sentence for the ask-again composed of only the words difficult for the user to hear. Accordingly, by extracting and emphasizing only the word that is especially difficult for the user to hear, it becomes possible for the user to easily hear this word. That is, when the ask-again by the user is detected, it is possible to generate and output the response sentence that the user can easily hear.

The voice interaction history, which is a history of the voice interaction performed between the user and the voice interaction system 1, includes a plurality of voice interactions. The voice interaction history is sequentially stored in the storage unit 9 or the like. For example, the frequency of appearance of the word when it is determined that it is difficult for the user to hear this word is experimentally obtained in advance as the first predetermined value, and this first predetermined value is stored in the storage unit 9.

Regarding the aforementioned response sentence for the ask-again formed of only a word whose frequency of appearance is the first predetermined value or smaller, an additional word may be added to this word. The response-sentence generation unit 4 may generate, for example, a response sentence for the ask-again "it was golf" obtained by adding the additional words "it was" to the word "golf" whose frequency of appearance is equal to or smaller than the first predetermined value in response to the response sentence just before the ask again "I went to Gifu to play golf". The additional word added to the aforementioned word may be set in the storage unit 9 in advance.

Further, the response-sentence generation unit 4 may generate a response sentence for the ask-again in which the word whose frequency of appearance is equal to or smaller than the first predetermined value is repeated a plurality of times. The response-sentence generation unit 4 may generate, for example, a response sentence for the ask-again "golf golf" formed of only the word "golf" whose frequency of appearance is equal to or smaller than the first predetermined value in response to the response sentence just before the ask again "I went to Gifu to play golf". In this way, by adding the additional word to the word or repeating the word a plurality of times, the user can hear this word more easily.

When the response-sentence generation unit 4 receives the detection signal from the ask again detection unit 8, the response-sentence generation unit 4 generates the response sentence for the ask-again based on the response sentence just before the ask-again.

The response-sentence generation unit 4 generates, when the response sentence just before the ask-again includes a word whose frequency of appearance in the voice interaction history is equal to or smaller than the first predetermined value, the response sentence for the ask-again formed of only this word.

On the other hand, when the response sentence just before the ask-again does not include a word whose frequency of appearance in the voice interaction history is equal to or smaller than the first predetermined value, the response-sentence generation unit 4 re-generates the response sentence as the response sentence for the ask-again.

The response-sentence generation unit 4 outputs the response sentence for the ask-again that has been generated to the voice output unit 5. The voice output unit 5 outputs the response sentence for the ask-again generated by the response-sentence generation unit 4 by voice. Accordingly, it is possible to appropriately respond to the ask-again by the user.

Figure 2:
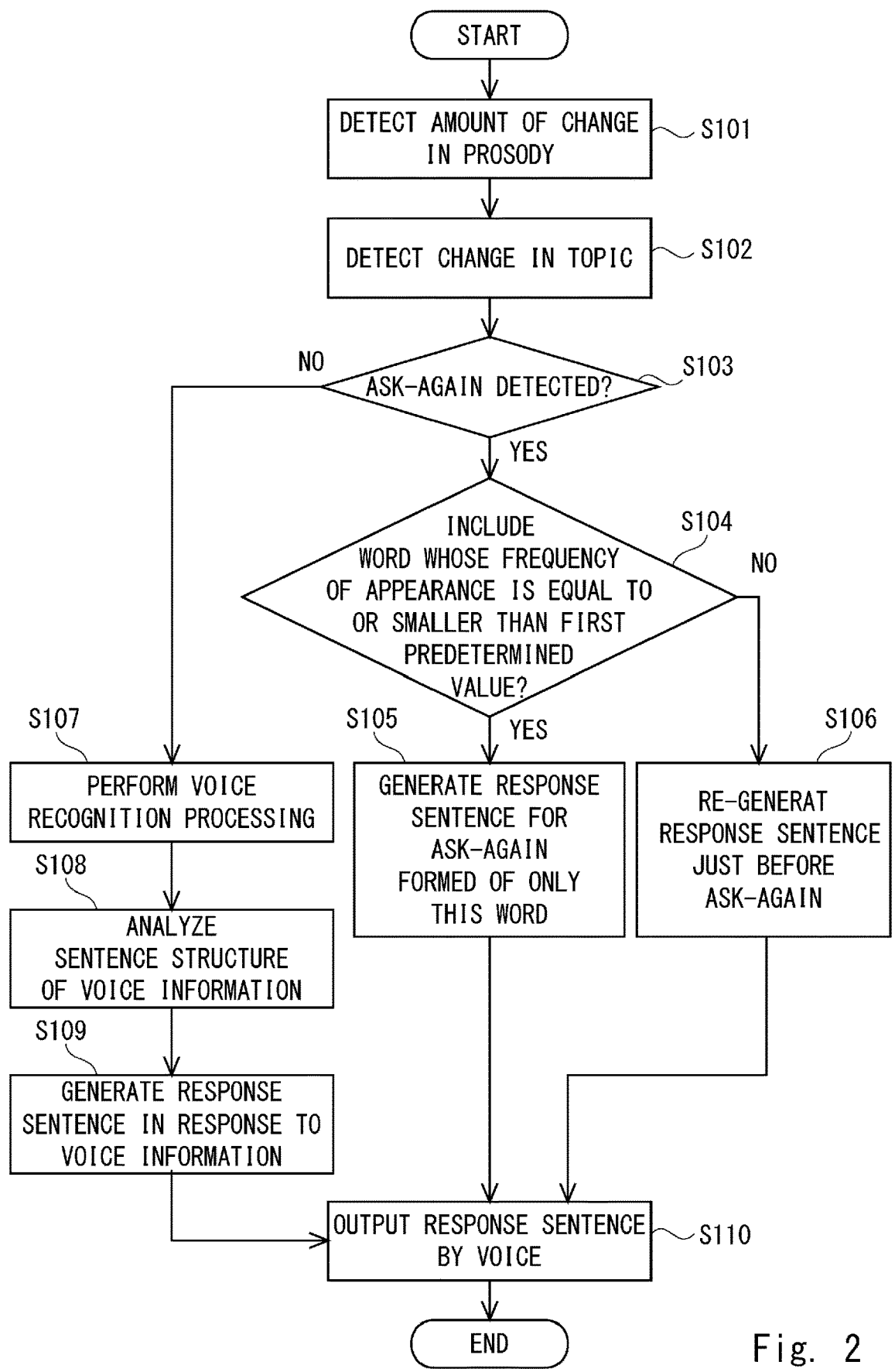
FIG. 2 is a flowchart showing a flow of a processing method for time voice interaction system according to the first embodiment of the present disclosure.

FIG. 2 is a flowchart showing a flow of a processing method for the voice interaction system according to the first embodiment of the present disclosure. The prosody detection unit 6 analyzes the prosody of the user's voice input via a microphone and detects the amount of change in the prosody (Step S101).

The topic detection unit 7 estimates the topic of the voice interaction and detects the change in the topic that has been estimated (Step S102). The ask-again detection unit 8 detects the user's voice as the ask-again by the user when the change in the topic has been detected by the topic detection unit 7 and the amount of change in the prosody detected by the prosody detection unit 6 is equal to or larger than a predetermined amount (Step S103).

When the ask-again detection unit 8 has detected the ask-again (YES in Step S103), the response-sentence generation unit 4 determines whether the response sentence just before the ask-again includes a word whose frequency of appearance in the voice interaction history is equal to or smaller than the first predetermined value (Step S104).

When the response-sentence generation unit 4 determines that the response sentence just before the ask-again includes a word whose frequency of appearance in the voice interaction history is equal to or smaller than the first predetermined value (YES in Step S104), the response-sentence generation unit 4 generates a response sentence for the ask-again formed of only this word (Step S105), outputs the response sentence that has been generated to the voice output unit 5, and then the process proceeds to (Step S110) that will be explained later.

On the other hand, when the response-sentence generation unit 4 determines that the response sentence just before the ask-again does not include a word whose frequency of appearance in the voice interaction history is equal to or smaller than the first predetermined value (NO in Step S104), the response-sentence generation unit 4 re-generates a response sentence just before the ask-again as the response sentence for the ask-again (Step S106), outputs the response sentence that has been generated to the voice output unit 5, then the process proceeds to (Step S110) that will be explained later.

When the ask-again detection unit 8 has not detected the ask-again (NO in Step S103), the voice recognition unit 2 performs voice recognition processing based on the information on the user's voice, converts the information on the user's voice into text, recognizes it as the character string information, and outputs the information on the user's voice that has been recognized to the syntactic analysis unit 3 (Step S107).

The syntactic analysis unit 3 analyzes the sentence structure of the voice information recognized by the voice recognition unit 2 and outputs the results of the analysis to the response-sentence generation unit 4 (Step S108). The response-sentence generation unit 4 generates the response sentence in response to the information on the user's voice based on the result of the analysis of the voice information analyzed by the syntactic analysis unit 3 (Step S109). The voice output unit 5 outputs the response sentence generated by the response-sentence generation unit 4 by voice (Step S110).

As described above, in the voice interaction system 1 according to the first embodiment, the response-sentence generation unit 4 generates, when the response sentence responding to the user just before the ask-again includes a word whose frequency of appearance in the history of the voice interaction with the user is equal to or smaller than the first predetermined value, a response sentence for the ask-again formed of only this word. Accordingly, by extracting and emphasizing only the word that is especially difficult for the user to hear, it becomes possible for the user to easily hear this word. That is, when the ask-again by the user is detected, it is possible to generate and output the response sentence that the user can easily hear.

Second Embodiment

In the aforementioned first embodiment, the response-sentence generation unit 4 generates, when the response sentence responding to the user just before the ask-again includes a word whose frequency of appearance in the voice interaction history is equal to or smaller than the first predetermined value, a response sentence for the ask-again formed of only this word. On the other hand, in the second embodiment of the present disclosure, the response-sentence generation unit 4 generates, when the response sentence just before the ask-again includes a word whose frequency of appearance in the voice interaction history is equal to or smaller than the first predetermined value, the response sentence for the ask-again in which this word is emphasized in the response sentence.

Accordingly, by emphasizing and accentuating the word that is especially difficult for the user to hear, it becomes possible for the user to easily hear this word. That is, when the ask-again by the user is detected, it is possible to generate and output the response sentence that the user can easily hear.

The response-sentence generation unit 4 generates, for example, the response sentence for the ask-again in which the voice speed of the word is made lower than the voice speed of the words other than this word in the response sentence just before the ask-again. Accordingly, it is possible to specifically accentuate this word whose voice speed is low and further emphasize this word in the response sentence for the ask-again so that the user will be able to easily hear this word.

The response-sentence generation unit 4 generates the response sentence for the ask-again in which the volume of the word is made larger than the volume of the words other than this word in the response sentence just before the ask-again. Accordingly, it is possible to specifically accentuate this word whose volume is large and further emphasize this word in the response sentence for the ask-again so that the user will be able to easily hear this word. The voice speed and the volume at which the user can easily hear the word are experimentally obtained and this voice speed and the volume are set in the storage unit 9.

The response-sentence generation unit 4 generates, in the response sentence just before the ask-again, a response sentence for the ask-again in which a space is made between the word and the preceding and following words. Accordingly, it is possible to specifically accentuate this word and further emphasize this word in the response sentence for the ask-again so that the user will be able to easily hear this word.

Further, the response-sentence generation unit 4 may generate the response sentence for the ask-again by arbitrarily combining the aforementioned methods in the response sentence just before the ask-again. The response-sentence generation unit 4 may generate, for example, the response sentence for the ask again in which the voice speed and the volume of the word are made lower than the voice speed and the volume of the words other than this word in the response sentence just before the ask-again. In the second embodiment, the parts that are the same as those in the first embodiment are denoted by the same reference symbols and detailed descriptions thereof will be omitted.

Third Embodiment

In a third embodiment of the present disclosure the response-sentence generation unit 4 generates, when the response sentence just before the ask-again includes a word whose frequency of appearance in the voice interaction history is the lowest, a response sentence for the ask-again formed of only this word or a response sentence for the ask-again in which only this word is emphasized.

It can be estimated that the word whose frequency of appearance is the lowest in the voice interaction history is the word unfamiliar to the user and thus the word that is the most difficult for the user to hear. Accordingly, the response-sentence generation unit 4 generates, when the response sentence just before the ask-again includes a word whose frequency of appearance in the voice interaction history is the lowest, a response sentence for the ask-again formed of only this word that is difficult for the user to hear or a response sentence for the ask-again in which only the word that is difficult for the user to hear is emphasized. It is therefore possible to accentuate the word that is the most difficult for the user to hear so that the user can easily hear this word.

Assume a case in which, for example, the frequency of appearance of each word in the voice interaction history is Gifu: 15 times, golf: 0 times, went: 52 times, and the response sentence just before the ask-again is "I went to Gifu to play golf".

In this case, the response-sentence generation unit 4 determines that the response sentence just before the ask-again "I went to Gifu to play golf" includes a word whose frequency of appearance in the voice interaction history is the lowest, that is, "golf". The response-sentence generation unit 4 generates a response sentence for the ask-again formed of only the word "golf" or a response sentence for the ask-again in which the word "golf" is emphasized in the response sentence.

In the third embodiment, the parts the same as those in the first and second embodiments are denoted by the same reference symbols and detailed descriptions thereof will be omitted.

Fourth Embodiment

In a fourth embodiment according to the present disclosure, the response-sentence generation unit 4 generates, when the response sentence just before the ask again includes a word whose frequency of appearance in the voice interaction history is equal to or smaller than the first predetermined value and whose degree of importance is equal to or larger than a second predetermined value, a response sentence for the ask-again formed of only this word or a response sentence for the ask-again in which this word is emphasized in the response sentence.

It can be estimated that the word whose frequency of appearance in the voice interaction history is low, which is equal to or smaller than the first predetermined value, is the word unfamiliar to the user and thus the word that is difficult for the user to hear. Further, when the degree of importance of this word is high, which is equal to or larger than the second predetermined value, it can be estimated that this word is not only difficult for the user to hear but also important (generally used).

Accordingly, as described above, the response-sentence generation unit 4 generates, when the response sentence just before the ask-again includes a word whose frequency of appearance in the voice interaction history is low, that is, equal to or lower than the first predetermined value, and whose degree of importance is high, that is, equal to or higher than the second predetermined value, a response sentence for the ask-again formed of only this word or a response sentence for the ask-again in which this word is emphasized in the response sentence. It is therefore possible to accentuate the important word that is especially difficult for the user to hear, so that the user can easily hear this word.

When, for example, there is little voice interaction history, the frequency of appearance of each word in the voice interaction history becomes naturally low. In this case, it is possible that the frequency of appearance of simply unusual words (words that are not generally used) as well as the words that are unfamiliar to the user may become equal to or smaller than the first predetermined value. Therefore, as described above, the response-sentence generation unit 4 extracts a word whose frequency of appearance in the voice interaction history is equal to or smaller than the first predetermined value and whose degree of importance is the second predetermined value or larger in the response sentence just before the ask-again. It is therefore possible to extract only the words that are unfamiliar to the user and accentuate this word, so that the user can easily hear this word.

As the second predetermined value, an optimal value that is experimentally obtained in advance is, for example, stored in the storage unit 9.

The degree of importance is, for example, a Term Frequency-Inverse Document Frequency (TF-IDF). The TF-IDF is calculated using the following expression.

$TF$=(frequency of appearance of the word $X$ in the voice interaction)/(sum of frequency of appearance of all the words in the voice interaction)

$IDF$=log{(the number of all the voice interactions included in the voice interaction history)/(the number of voice interactions that include the word $X$)}

$TF\text{-}IDF = TF \times IDF$

The response-sentence generation unit 4 generates, for example, when the response sentence just before the ask-again includes a word whose frequency of appearance in the voice interaction history is equal to or smaller than the first predetermined value (10 times) and whose TF-IDF is equal to or larger than the second predetermined value (0.3), a response sentence for the ask-again formed of only this word or a response sentence for the ask-again in which this word is emphasized in the response sentence.

It is assumed that the aforementioned first and second predetermined values can be arbitrarily set by the user via an input apparatus or the like.

Assume a case in which the frequency of appearance of each word in the voice interaction history and the TF-IDF are, for example, values as shown in FIG. 3, and the response sentence just before the ask-again is "I met Hanako in Gifu".

The response-sentence generation unit 4 determines that the response sentence just before the ask-again "I met Hanako in Gifu" includes a word "Hanako" whose frequency of appearance in the voice interaction history is 10 times or lower and whose TF-IDF is 0.3 or larger. The response-sentence generation unit 4 generates a response sentence for the ask-again "Hanako", which is formed of only this word "Hanako". Alternatively, the response-sentence generation unit 4 generates a response sentence for the ask-again "I met <Hanako> Gifu", in which the word "Hanako" in the response sentence "I met Hanako in Gifu" is emphasized. Accordingly, it is possible to accentuate the important word "Hanako" that is especially difficult for the user to hear, so that the user can easily hear this word.

While the degree of importance is TF-IDF in the fourth embodiment, it is merely an example. The degree of importance may be any index that indicates the degree of importance of a word. In the fourth embodiment, the parts that are the same as those in the first to third embodiments are denoted by the same reference symbols and detailed descriptions thereof will be omitted.

Fifth Embodiment

In a fifth embodiment of the present disclosure, the response-sentence generation unit 4 generates, when the response sentence just before the ask-again includes a word whose frequency of appearance in the voice interaction history is equal to or smaller than the first predetermined value and whose frequency of appearance in a general interaction history is equal to or larger than a third predetermined value, a response sentence for the ask-again formed of only this word or a response sentence for the ask-again in which this word is emphasized in the response sentence.

The aforementioned general interaction history is a wide range of voice interaction history including not only the voice interaction between the user and the voice interaction system 1 but also a history of a voice interaction between users or a history of a voice interaction between general voice interaction systems. The general interaction history is stored, for example, in the storage unit 9 or a database connected to a network such as the Internet. The response-sentence generation unit 4 acquires the general interaction history from the storage unit 9, the database, or the like. Further, as the aforementioned third predetermined value, an optimal value experimentally obtained in advance is, for example, stored in the storage unit 9.

It can be estimated that a word whose frequency of appearance in the voice interaction history is low, which is equal to or smaller than the first predetermined value, is the word that is unfamiliar to the user and thus the word that is difficult for the user to hear. Further, it can be estimated that, in the general interaction history, a word whose frequency of appearance is high, that is, equal to or larger than the third predetermined value, is not only difficult for the user to hear but also widely and generally used.

Accordingly, as described above, when the response sentence just before the ask-again includes a word whose frequency of appearance in the voice interaction history is equal to or smaller than the first predetermined value and whose frequency of appearance in the general interaction history is equal to or larger than the third predetermined value, the response-sentence generation unit 4 generates a response sentence for the ask-again formed of only this word or a response sentence for the ask-again in which this word is emphasized in the response sentence. It is therefore possible to accentuate the word that is especially difficult for the user to hear and is generally used (important word), so that the user can easily hear this word. That is, when ask-again by the user has been detected, it is possible to generate a response sentence that the user can hear more easily and output the response sentence that has been generated. In the fifth embodiment, the parts the same as those in the first to fourth embodiments are denoted by the same reference symbols and detailed descriptions thereof will be omitted.

While some embodiments of this disclosure have been described above, these embodiments are presented as examples and not intended to limit the scope of the disclosure. These novel embodiments can be implemented in other various forms, and various types of omissions, substitutions, or changes can be made without departing from the spirit of the disclosure. These embodiments and their modifications, as would fall within the scope and spirit of the disclosure, are included in the disclosure provided in the claims and the scope of equivalents thereof.

The present disclosure is able to achieve, for example, the processing shown in FIG. 2 by causing a CPU to execute a computer program.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magnetooptical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.).

Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A voice interaction system that performs a voice interaction with a user, the system comprising:
    ask-again detection means for detecting ask-again by the user;
    response-sentence generation means for generating, when the ask-again has been detected by the ask-again detection means, a response sentence for the ask-again in response to the ask-again based on a previous response sentence responding to the user before the ask-again; and
    storage means for storing a history of the voice interaction with the user,
    wherein the response-sentence generation means generates, in response to determining that the previous response sentence includes a word whose frequency of appearance in the history of the voice interaction in the storage means is equal to or smaller than a first predetermined value, the response sentence for the ask-again formed of only this word or the response sentence for the ask-again in which this word is emphasized in the response sentence.

2. The voice interaction system according to claim 1, wherein the response-sentence generation means generates, in response to determining that the previous response sentence includes a word whose frequency of appearance in the history of the voice interaction in the storage means is the lowest, the response sentence for the ask-again formed of only this word or the response sentence for the ask-again in which this word is emphasized in the response sentence.

3. The voice interaction system according to claim 1, wherein
    the response-sentence generation means generates,
        in response to determining that the previous response sentence includes a word whose frequency of appearance in the history of the voice interaction in the storage means is equal to or smaller than the first predetermined value,
    at least one of the response sentence for the ask-again in which the voice speed of this word is made lower than the voice speed of words other than this word, the response sentence for the ask-again in which a volume of this word is made larger than a volume of words other than this word, and the response sentence for the ask-again in which a space is made between this word and the preceding and following words.

4. The voice interaction system according to claim 1, wherein the response-sentence generation means generates, in response to determining that the response sentence includes a word whose frequency of appearance in the history of the voice interaction in the storage means is equal to or smaller than the first predetermined value and whose degree of importance is equal to or larger than a second predetermined value, the response sentence for the ask-again formed of only this word or the response sentence for the ask-again in which this word is emphasized in the response sentence.

5. The voice interaction system according to claim 1, further comprising topic detection means for estimating a topic of the voice interaction and detecting a change in the topic that has been estimated,
    wherein the ask-again detection means detects, when the change in the topic has been detected by the topic detection means, the user's voice as the ask-again by the user based on prosodic information on the user's voice.

6. The voice interaction system according to claim 5, further comprising prosody detection means for analyzing the prosodic information on the user's voice and detecting an amount of change in prosody,
    wherein the ask-again detection means detects, when the change in the topic has been detected by the topic detection means and the amount of change in the prosody detected by the prosody detection means is equal to or larger than a predetermined amount, the user's voice as the ask-again by the user.

7. A processing method for a voice interaction system that performs a voice interaction with a user, the method comprising the steps of:
    detecting ask-again by the user;
    generating, when the ask-again has been detected, a response sentence for the ask-again in response to the ask-again based on a previous response sentence responding to the user before the ask-again; and
    generating, in response to determining that the previous response sentence includes a word whose frequency of appearance in a history of the voice interaction with the user is equal to or smaller than a first predetermined value, the response sentence for the ask-again formed of only this word or the response sentence for the ask-again in which this word is emphasized in the response sentence, and wherein the response sentence and the previous response sentence are generated by the voice interaction system.

8. A non-transitory computer readable, medium storing a program for a voice interaction system that performs a voice interaction with a user, the program causing a computer to execute the following processing of:

detecting ask-again by the user; and generating, when the ask-again has been detected, a response sentence for the ask-again in response to the ask-again based on a previous response sentence responding to the user before the ask-again, wherein, in response to determining that the previous response sentence includes a word whose frequency of appearance in a history of the voice interaction with the user is equal to or smaller than a first predetermined value, the response sentence for the ask-again formed of only this word or the response sentence for the ask-again in which this word is emphasized in the response sentence is generated, and wherein the response sentence and the previous response sentence are generated by the voice interaction system.

9. A voice interaction system that performs a voice interaction with a user, the system comprising:

a processor programmed to:

detect ask-again by the user; and generate, when the ask-again has been detected, a response sentence for the ask-again in response to the ask-again based on a previous response sentence responding to the user before the ask-again; and a storage configured to store a history of the voice interaction with the user, wherein the processor is programmed to generate, in response to determining that the previous response sentence includes a word whose frequency of appearance in the history of the voice interaction in the storage is equal to or smaller than a first predetermined value, the response sentence for the ask-again formed of only this word or the response sentence for the ask-again in which this word is emphasized in the response sentence, and wherein the response sentence and the previous response sentence are generated by the voice interaction system.

* * * * *